United States Patent

[11] 3,561,556

| [72] | Inventor | John W. Davies, III<br>Plymouth, Wis. |
|---|---|---|
| [21] | Appl. No. | 737,078 |
| [22] | Filed | June 14, 1968 |
| [45] | Patented | Feb. 9, 1971 |
| [73] | Assignee | Gilson Bros. Co.<br>Plymouth, Wis.<br>a corporation of Wisconsin |

[54] RIDING MOWER
7 Claims, 5 Drawing Figs.

[52] U.S. Cl. .................................................. 180/54
[51] Int. Cl. .......................................... B62d 23/00
[50] Field of Search .................................. 180/54(2),
54(3), 54, (65), 1, 11, 54.4; 56/25.4

[56] References Cited
UNITED STATES PATENTS

| 3,466,855 | 9/1969 | Hanson et al. .............. | 56/25.4 |
| 1,557,902 | 10/1925 | Thompson .................... | 180/11UX |
| 2,817,406 | 12/1957 | Brewer ......................... | 180/11 |
| 2,895,279 | 7/1959 | Schrage ........................ | 180/11X |
| 3,154,903 | 11/1964 | Smith ........................... | 56/25.4 |
| 3,229,452 | 1/1966 | Hasenbank ................... | 56/25.4 |

*Primary Examiner*—Benjamin Hersh
*Assistant Examiner*—Milton L. Smith
*Attorney*—Wheeler, Wheeler, House & Clemency

ABSTRACT: A riding mower frame assembly having an engine base connected to a front wheel shroud by a channel shaped box beam with a seat support pedestal having rearwardly diverging sidewalls mounted on the box beam with the lower edges of the sidewalls welded to the engine base on each side of the box beam to constitute the pedestal as an overhead base reinforcing truss.

PATENTED FEB 9 1971
3,561,556
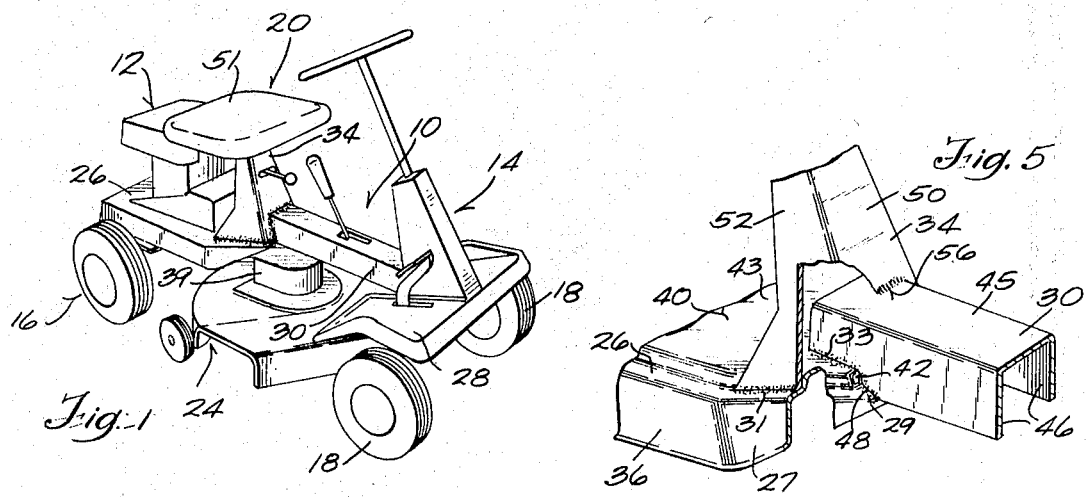
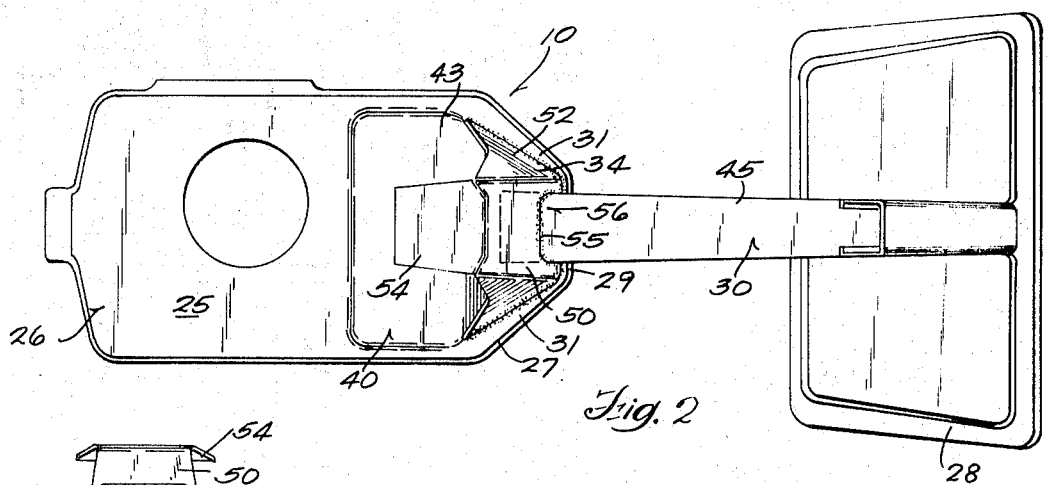
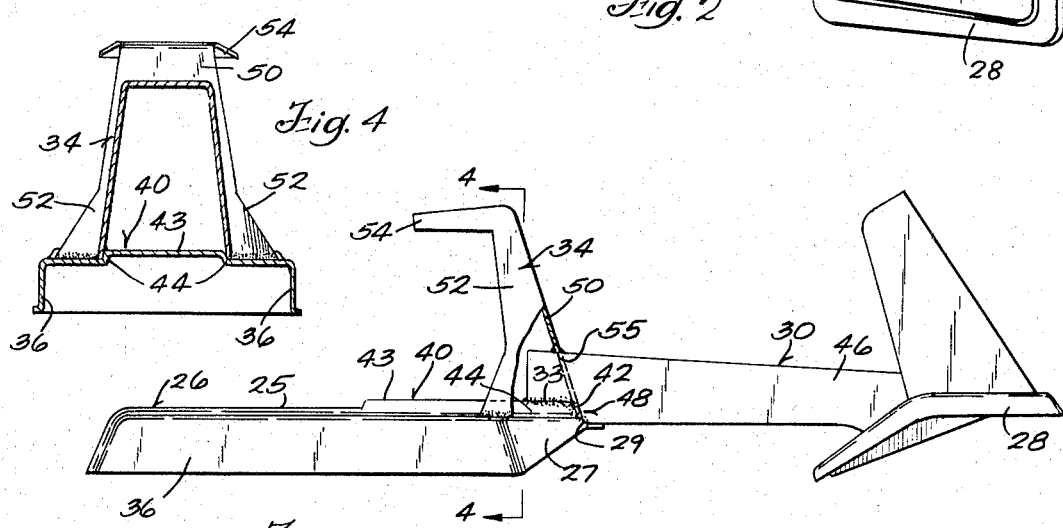
Inventor
John W. Davies III
By Wheeler, Wheeler, House & Clemency
Attorneys

RIDING MOWER

BACKGROUND OF THE INVENTION

Certain types of riding mowers have their engine mounted in the rear of an engine base connected to a front wheel shroud by a central narrow beam. Drive wheels are provided beneath the engine base. Front wheels are mounted beneath a front wheel shroud. The engine base and central beam together form a composite longitudinal beam supported at each end by the wheels. The rotary mower is suspended beneath the narrow beam and an operators seat is located near the center of the beam. When the power mower is in use with the weight of the operator imposed on the operators seat, a substantial bending moment is created at the connection of the narrow beam to the engine base. Previous efforts to reinforce the engine base at the connection of the engine base to the narrow beam have involved relatively deep edge flanges on the engine base frame beneath this connection. These flanges depend downwardly from the engine base for a substantial distance and result in a loss in clearance in the space beneath the frame where the rotary mower is located.

SUMMARY OF THE INVENTION

In the riding mower of the present invention, an improved frame assembly is provided in which the engine base is reinforced from above in the area of the connection of the narrow box beam to the engine base. This frame assembly includes an engine base connected to a front wheel shroud by a narrow channel shaped box beam and a seat support pedestal mounted over the box beam and secured to the surface of the engine base in close proximity to the connection of the box beam to the surface of the engine base. The connection of the seat support pedestal to the surface of the engine base around the connection with the box beam constitutes an overhead truss to stiffen that portion of the engine base sufficiently to resist distortion as a result of the large bending moment present at the connection. The seat support pedestal is also in direct engagement with the box beam to increase the strength of the weld between the box beam and the engine base. The increase in strength of this portion of the engine base and the weld has made it possible to eliminate or reduce the need for marginal flanges beneath the base at the junction of the base and beam, thereby providing a greater clearance for the rotary mower when it is located centrally beneath the mower frame.

Other objects and advantages of the present invention will become apparent from the following detailed description when read in connection with the accompanying drawings in which:

FIG. 1 is a perspective view of a riding mower with the improved frame assembly.

FIG. 2 is a top view of the improved frame assembly.

FIG. 3 is a side view of the frame assembly.

FIG. 4 is a view taken on line 4—4 of FIG. 3 showing the connection of the seat support pedestal to the engine base.

FIG. 5 is a fragmentary perspective view of a portion of the frame assembly with a portion broken away to show the connection of the box beam, engine base and seat support pedestal.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

A riding mower embodying the invention includes a frame assembly 10 carrying an engine 12 mounted on the rear of the frame assembly and a steering assembly housing 14 mounted at the front of the frame assembly. Drive wheels 16 are mounted at the rear of the frame assembly beneath the engine 12 with an appropriate drive connection (not shown) for driving the wheels 16. Front wheels 18 are mounted beneath wheel shroud 28 at the front of the frame assembly and are operatively connected to the steering assembly within housing 14 for controlling the direction of motion of the vehicle. A seat assembly 20 is mounted on the frame assembly 10 forward of the engine 12 in substantially the center of the vehicle. A rotary mower 24 is located beneath the frame assembly.

The improved frame assembly 10 includes an engine base 26 connected to a front wheel shroud 28 by a narrow channel shaped box beam 30. Beam 30 could have any cross-sectional configuration. In the disclosed embodiment, it is rectangular. A seat support pedestal 34 which is a part of the seat assembly 20 is secured to the engine base 26 in the area of the connection of the channel shaped box beam 30 to the engine base 26.

The engine base is formed from a single piece of sheet material to form a hollow pan shaped structure having an upper flat deck 25 on which the engine 12 is mounted. At its sides base 26 has relatively deep marginal flanges 36. The forward end of base 26 tapers inwardly and has an upwardly tapered flange 27 which converges to a shallow front transverse wall 29 on base 26. A raised or elevated boss 40 is provided in the front portion of the engine base 26. Boss 40 is spaced inwardly from the outer edges of the base 26, thus to leave a narrow rabbit 31 around the front and sides of the boss 40. Boss 40 has a flat upper surface 43 with a front wall 42 transverse to the longitudinal axis of the engine base and rearwardly diverging sidewalls 44.

The channel shaped box beam 30 is connected to the front of the engine base 26 by welding upwardly relieved edges 33 of the depending sidewalls 46 of the box beam to the boss top surface 43. The depending sidewalls 46 of the box beam are cut away at the rear of the box beam to provide the upwardly relieved welding edges 33, and also a pair of arcuate notches 48 which matingly engage the front wall 29 of the engine base and the front wall 42 of the elevated boss 40. These edges are welded to secure the channel 30 to the base 26.

The front portion of the engine base 26 around its intersection with the box beam 30 is reinforced by securing the seat support pedestal 34 to the engine base in the manner of an overhead truss. The seat support pedestal 34 is formed from a single piece of metal with an upwardly and rearwardly sloping front wall 50 and rearwardly diverging sidewalls 52. The angular relation of the sidewalls 52 to the front wall 50 is substantially the same as the angular relation of the sidewalls 44 and front wall 42 of the boss 40. A seat supporting bracket 54 is provided at the top of the seat support pedestal 34 for a seat 51. An aperture or opening 56 having substantially the same shape as the cross section of the box beam 30 is cut in the front wall 50 of the pedestal.

The pedestal 34 is mounted rigidly on the box beam 30 and on engine base 26 by placing the lower edges of the sidewalls 52 and front wall 50 on the rabbit 31 and in lateral engagement with the sidewalls 44 and front wall 42, respectively, of the boss 40. The box beam 30 extends through aperture 56 in the pedestal front wall 50. The pedestal 34 is then welded onto the rabbit 31 of the engine base 26 along the full length of the line of contact between the lower edges of the pedestal and the sidewalls 44 and front wall 42 of the boss 40. The upper edge 55 of the aperture 56 in the front wall of the pedestal should engage the upper surface 45 of the channel shaped box beam 30 and is welded thereto.

The seat support pedestal 34 embraces both the channel beam 30 and the boss 40 on the base 26. The welds aforesaid unite the parts in an overhead truss configuration which reinforces or stiffens the frame and eliminates any need for deep downwardly extending flanges at the intersection of the beam with the base. The shallow upwardly tapering flanges 27 are entirely adequate and do not materially interfere with the mower 24. Moreover, no cross flange is needed at the undersurface of the front edge of base 26. This leaves ample clearance beneath the frame for mower 24.

The rotary mower can then be located further to the rear of the frame. The total length of the frame can then be shortened making a more compact unit. The overall height of the riding

I claim:

1. A frame assembly for a power mower comprising:
   an engine base;
   a front wheel assembly;
   a frame beam connected rigidly in stress transmitting relation to the engine base and to the front wheel assembly; and
   a seat support pedestal above the base and having rearwardly extending sidewalls unitarily connected along their lower edges to the engine base, thus to form an overhead engine base reinforcing truss to stiffen the base against such stress.

2. A frame assembly according to claim 1 wherein said engine base has a depending flange around its outer periphery which converges inwardly and tapers upwardly at the forward portion of the engine base beneath the connection of the beam with the engine base.

3. A frame assembly according to claim 1 wherein said pedestal has a front wall with an opening therein, said beam extending through said opening.

4. A frame assembly for a power mower comprising an engine base, a front wheel assembly, a frame beam connected to the engine base and to the front wheel assembly, and a seat support pedestal above the base and having rearwardly extending sidewalls connected to the engine base, thus to form an overhead engine base reinforcing truss, said engine base including an elevated boss having a front wall and sidewalls, a said sidewalls of said pedestal matingly engaging the front wall and side walls of said elevated boss.

5. A frame assembly for a power mower comprising an engine base, a front wheel assembly, a frame beam connected to the engine base and to the front wheel assembly, and a seat support pedestal above the base and having rearwardly extending sidewalls connected to the engine base, thus to form an overhead engine base reinforcing truss, said beam comprising a narrow channel shaped box beam having depending sidewalls with a portion of the edges of said sidewalls welded to the engine base, said seat support pedestal having a front wall and rearwardly diverging sidewalls at the sides of the beam.

6. A frame assembly according to claim 5 in which the engine base has an elevated boss having a front wall and rearwardly diverging sidewalls, said seat support pedestal being connected to the engine base by welding the sidewalls and front wall of the pedestal to the sidewalls and front wall of the elevated boss.

7. A frame assembly according to claim 6 wherein the front wall of the pedestal is welded to the top of the box beam.